June 2, 1959
C. E. BATES
2,889,392
VENT CAP
Filed Nov. 23, 1956
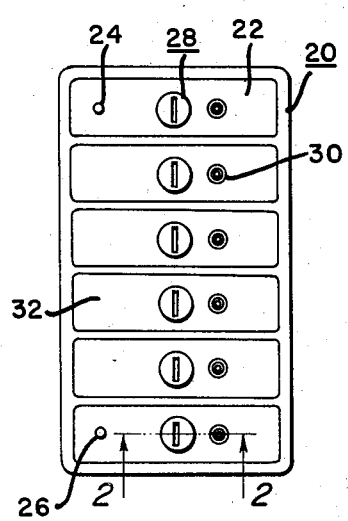
Fig. 1
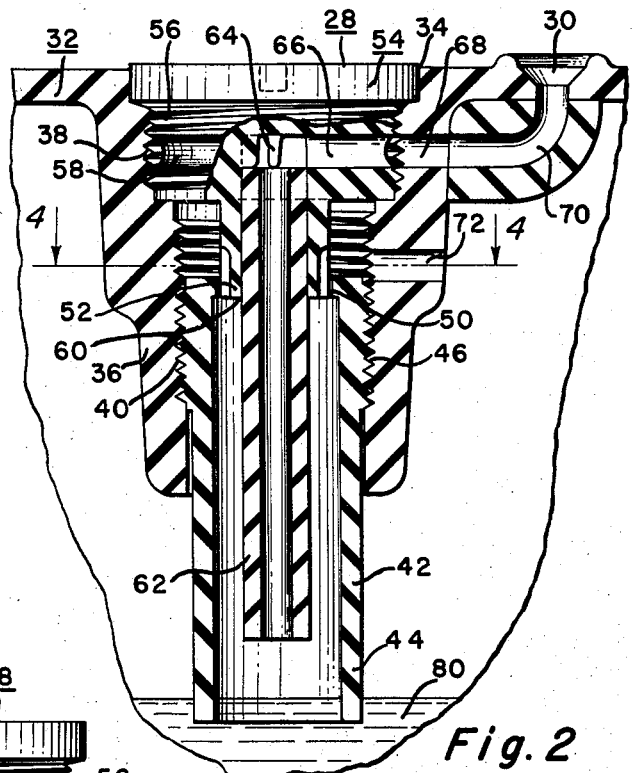
Fig. 2
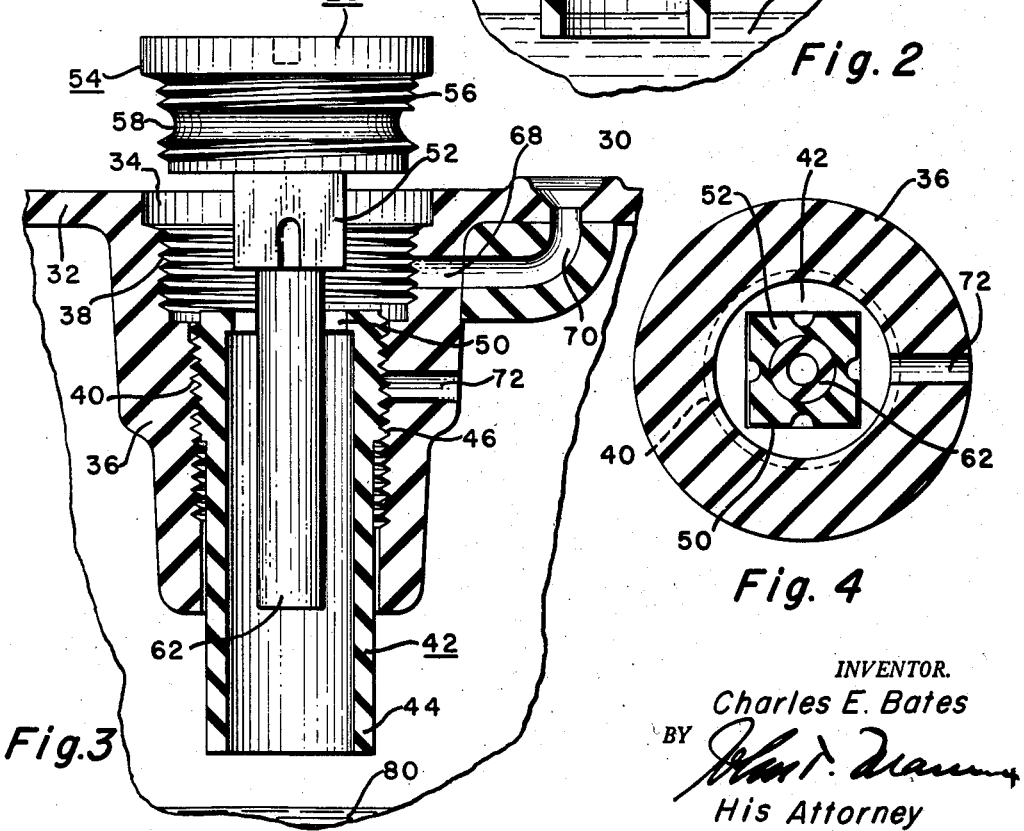
Fig. 3
Fig. 4
INVENTOR.
Charles E. Bates
BY
His Attorney

United States Patent Office 2,889,392
Patented June 2, 1959

2,889,392

VENT CAP

Charles E. Bates, Daleville, Ind., assignor to General Motors Corporation, Detroit, Mich., a corporation of Delaware Application November 23, 1956, Serial No. 624,094

2 Claims. (Cl. 136—177)

This invention relates to venting devices for storage batteries and is particularly concerned with venting devices which prevent overfilling of the battery and also prevent spilling of battery electrolyte in the event that the battery is overturned.

It is, therefore, an object of the invention to provide a combination nonspill, nonoverfill cap which predetermines the level of electrolyte within the battery and prevents overfilling thereof in one position and which, in another position, seals the battery against spillage, even though the battery is overturned, while simultaneously permitting venting thereof. This object is carried out by providing a cap made in two parts, one of which is removable, wherein said parts are keyed together so that removal of the one part conditions the other part for operation thereof and wherein the assembly of the first part automatically positions the second part to a second position.

Further objects and advantages of the present invention will be apparent from the following description, reference being had to the accompanying drawings, wherein preferred embodiments of the present invention are clearly shown.

In the drawings:

Figure 1 is a top view of a storage battery of the twelve-volt type including six cells.

Figure 2 is a fragmentary and enlarged sectional view taken on Figure 1 wherein the cap is in normal operating position.

Figure 3 is a view taken on line 2—2 of Figure 1 and similar to that shown in Figure 2 except that the cap has been moved to a second position and a filler plug thereof is in the process of being removed.

Figure 4 is a sectional view taken on line 4—4 of Figure 2 showing the key means between the two parts of the vent cap.

Venting devices are used in connection with storage battery cells to permit gases to escape from the cell. Such caps also provide a means for filling the cell with electrolyte or water.

In more recent years, there has been a trend toward limiting the quantity of electrolyte which can be filled into a cell and vent caps have been suggested which prevent overfilling of the battery container whereby the more desirable condition is attained.

The present invention is directed to such a venting device that accomplishes this end and which has a second desirable feature, namely, a nonspill feature.

In Patent No. 2,405,736, one style of nonspill vent cap is shown wherein a weighted valve is utilized which, upon tipping of the battery, closes off the container from the exterior of the battery, thereby preventing spilling of the electrolyte. Nonspill plugs are used extensively in aeronautical applications where the pilot may fly the airplane upside down or on steep banks wherein spillage of the electrolyte is not only possible but creates very undesirable conditions within the plane.

The present cap includes a nonspill feature which co-operates with the nonoverfill feature wherein a tube is utilized together with a compartment above the electrolyte level of sufficient volume to permit complete inversion of the battery without spilling while simultaneously permitting venting of the battery in this position, an advantage not apparent in the usual type of nonspill vent plugs.

The nonspill and nonoverfill features incorporated in the instant plug, or cap, are accomplished with a rather simple construction wherein two parts of the plug are keyed together and cooperate to achieve the desired results. The plug is of relatively inexpensive design and presents no moving parts which may become sulfated and fouled during use of the battery.

Referring specifically to the drawings, in Figure 1 a battery 20 is shown in a plan view which includes six individual cells 22. The end cells have terminals 24 and 26 extending therethrough which may be connected to suitable electrical leads. The cells are connected in series by hidden connectors, not shown. In the battery shown at 20, each cell is provided with an identical filler plug 28 and with an identical vent opening 30. It is understood that these vents may all be connected to a common conduit within or external of the battery to provide a single vent opening, if desired, the form shown being exemplary of one construction. Each cell 22 of the battery 20 includes a cell cover 32 made of hard rubber-like material which has a central opening 34 therein that includes a downwardly extending boss 36 therearound. The opening 34 includes internal threads at 38 and 40. The threads 38 and 40 are of different diameter as will be explained hereinafter. Within the boss 36 is assembled a tube of acid resisting material 42 which comprises a downwardly extending tubular member 44 and an integral threaded portion 46 at one end thereof. The portion 46 may be screw threaded into the threads 40 and the tubular portion 44 passes through the opening 34 in the boss 36 and downwardly from the cover 32. The tubular member 42 has a square aperture 50 at the upper end of its bore, which accommodates a square downwardly extending key 52 carried by the plug assembly 54. This assembly includes the cap 28 which is threaded at 56 to mesh with threads 38 in the cover. The thread 56 includes an annular groove 58 intermediate its ends. The square key portion 52 is bored at 60 to accommodate a downwardly extending tubular member 62 which is press-fitted and preferably cemented therein. The upper end of the bore 60 has means 64 therein to prevent the tube from bottoming in the bore and this means is shown as a castellated portion which cooperates with a cross bore 66. Thus, the tube 62, due to the means 64, presents a through passage from one end thereof to the other which cooperates with the cross bore 66.

At the upper end of the boss 36, and properly positioned from the top of the cover 32, is an aperture 68 which aligns with the groove 58 which, in turn, is intersected by the bore 66. The aperture 68 cooperates with a duct 70 that is connected to the vent 30. As previously stated, this duct 70 may be connected to all cells or one cell, as is desired, and forms no part of the invention. Intermediate the ends of the boss 36 is another aperture or duct 72 passing transversely thereof and opening into the threads 40. The duct 72 opens into the internal structure of the cell chamber.

In operation, the tubular member 42 is placed in the cell cover and the thread thereof is started in thread 40. The plug 28 is then inserted so that its tube 62 passes through the square aperture 50 and the square portion 52 thereof engages in the aperture 50 to key the two parts together. The plug may then be screwed inwardly so that the threads 56 of the plug engage the threads 38 in the cover. As the plug 28 is screwed inwardly, the key 52 causes the tubular member 42 to turn and screw downwardly to the position shown in Figure 2 where the entire assembly is in one operative position. In this position, the duct 72 communicates through the loosely keyed connection with the internal bore of the tube 42 to equalize pressures therein. The tube 62 is slightly above the electrolyte level shown at 80 and vents gases formed by the electrolyte through the tube 62, ducts 66, 68 and 70 to the vent 30. When the battery is inverted, the electrolyte moves into the upper portion of the chamber, surrounding the boss 36 which chamber has sufficient volume to contain all of the electrolyte and still permit the tube 62 to remain open above the level of the electrolyte. Thus, no electrolyte can spill out of the battery through the tube 62 which is the only communication with the outside of the battery. However, during this procedure, gases formed can pass through the tube 62 and out of vent 30.

When it is desired to replenish the electrolyte or add water to the battery, plug 28 is removed by unscrewing the same which causes the key portion 52 thereof to turn the tube 42 in its threads. When this happens, the tube 42 seals off the duct 72 and, when the vent cap 28 is detached from its threads, the entire upper assembly including the tube 62 may be removed from the battery. At this time, electrolyte or water can be poured into the opening and pass through the tube 42 into the main chamber of the battery. It is apparent that the battery chamber is sealed from the atmosphere except through the bore of the tube 42. Thus, when sufficient electrolyte or water is added, to fill the tube 42 to the level of the cover, no more fluid can be added. Of course, when fluid begins to rise in the tube 42, filling is generally discontinued. In any event, this structure prevents overfilling of the battery. As soon as the cap 28 is reinserted and screwed downwardly, the tube 42 moves downwardly and uncovers the vent 72 which equalizes pressures within the tube 42 and the upper portion of the chamber of the battery through the loosely keyed connection in the squared portion 50 which permits equalization of the level of the electrolyte within the tube 42 and within the battery chamber so that the electrolyte level, as shown at 80 in Figure 2, is obtained.

The present invention, therefore, acts both as a non-overfill and a nonspill type of cap. The two parts thereof cooperate in the several positions of the device to permit filling without overfilling and to permit venting without spilling. The device is simple in construction and requires no moving parts which must function during its operation.

In some cases, it may be desirable to limit the upward movement of the tube 42 and this can be easily done by the screwing of a shim to the bottom of threads 38. This deviation is fully within mechanical skill to provide the desired results and forms no part of this invention. It is understood that the parts of this device may be made from hard rubber, polystyrene, polyethylene, phenolics, or any other moldable material which is unaffected by battery acid. Similarly, the material used in the battery cover 22 may be varied so long as the cover withstands the effects of the battery electrolyte.

The length of the tubes may be varied to obtain any desired result but it is understood that the inner vent tube 62 must be shorter than the outer filling tube 42 and it is also apparent that the volume of the chamber above the electrolyte and the end of tube 62 must be sufficient to accommodate the electrolyte without overflowing into the tube 62 when the battery is inverted. In other words, the volume above the electrolyte must be at least equal and preferably more than the volume of the chamber below the level of the tube.

While the embodiments of the present invention as herein disclosed constitute preferred forms, it is to be understood that other forms might be adopted.

What is claimed is as follows:

1. In a battery having a filler portion including a bore having two diameters including upper and lower threaded portions, upper and lower transverse passages intersecting respectively said upper and lower threaded portions of said bore, said lower transverse passage communicating with the inside of the battery compartment and said upper transverse passage communicating with the outside of the battery, the combination of a non-overfill and non-spill assembly, comprising a tubular member having external threads cooperating with said lower threads of said filler portions, said tubular member having radially inwardly extending wall portions at its upper end, a closure member having external threads for cooperation with said upper threads in said filler portion, a non-spill tube extending from said closure member, means in said closure member for connecting said upper transverse passage with the opening in said non-spill tube, means extending from said closure member adapted to cooperate with said wall portion in said tubular member so as to screw said tubular member upwardly to seal said lower transverse passage when said closure member is removed from said filler portion whereby the battery may be filled with a limited quantity of liquid.

2. In a battery having a filler portion including a bore having two diameters including upper and lower threaded portions, upper and lower transverse passages intersecting respectively said upper and lower threaded portions in said bore, said upper transverse passage communicating with the outside of the battery and said lower transverse passage communicating with the inside battery compartment, the combination of a non-overfill and non-spill assembly, comprising a tubular member having external threads cooperating with said lower threads of said filler portion, said tubular member having radially extending wall portions at its upper end, a closure member having external threads for cooperation with said upper threads of said filler portion, a non-spill tube extending from said closure member, an annular recess circumferentially surrounding said closure member so as to communicate with said upper transverse passage when said closure member is fully threaded into said upper threads of said filler portion, a passage in said closure member connecting said annular recess with the opening in said non-spill tube, means extending from said closure member adapted to cooperate with said radially extending wall portions in said tubular member so as to screw said tubular member upwardly to seal said lower transverse passage when said closure member is removed from said filler portion whereby the battery may be filled with a limited quantity of liquid.

References Cited in the file of this patent

UNITED STATES PATENTS

| 2,141,621 | Setzer | Dec. 27, 1938 |
| 2,175,993 | Lighton | Oct. 10, 1939 |
| 2,306,982 | Rolph | Dec. 29, 1942 |
| 2,335,157 | Nassimbene | Nov. 23, 1943 |
| 2,364,896 | Gray | Dec. 12, 1944 |
| 2,368,491 | Proctor | Jan. 30, 1945 |

FOREIGN PATENTS

| 344,433 | Great Britain | Mar. 5, 1931 |
| 336,041 | Great Britain | Oct. 9, 1936 |